May 14, 1946.　　　A. NACCACHE　　　2,400,432
INTERNAL-COMBUSTION ENGINE
Filed Dec. 18, 1941　　　3 Sheets-Sheet 1

Inventor
Albert Naccache
By
Williams, Bradbury & Hinkle Attys.

May 14, 1946.　　A. NACCACHE　　2,400,432
INTERNAL-COMBUSTION ENGINE
Filed Dec. 18, 1941　　3 Sheets-Sheet 2
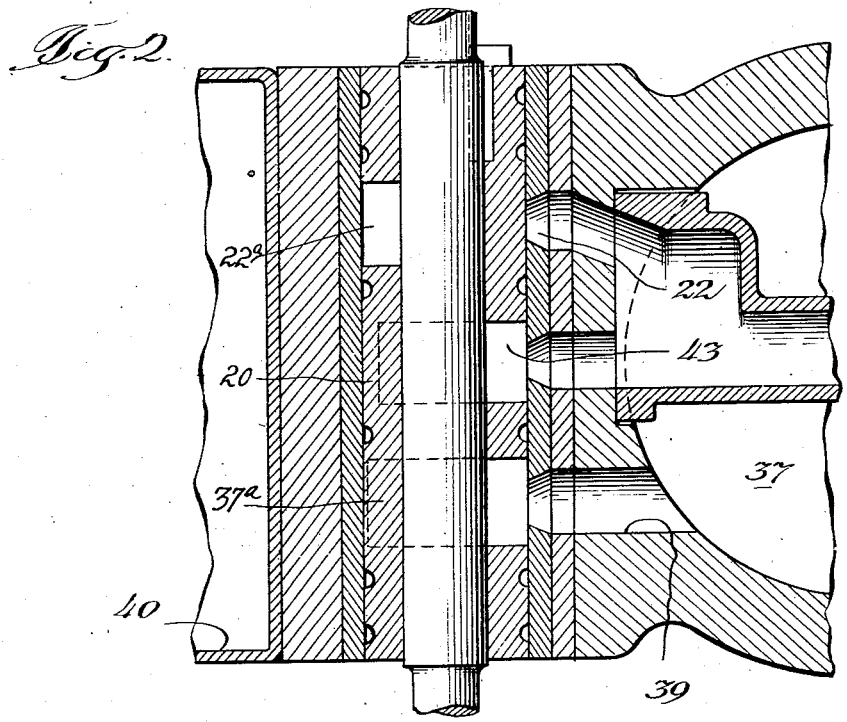
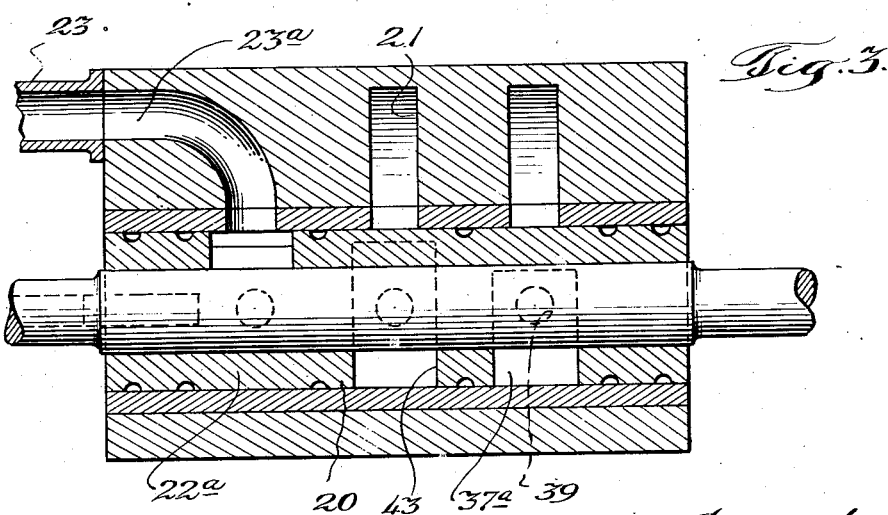

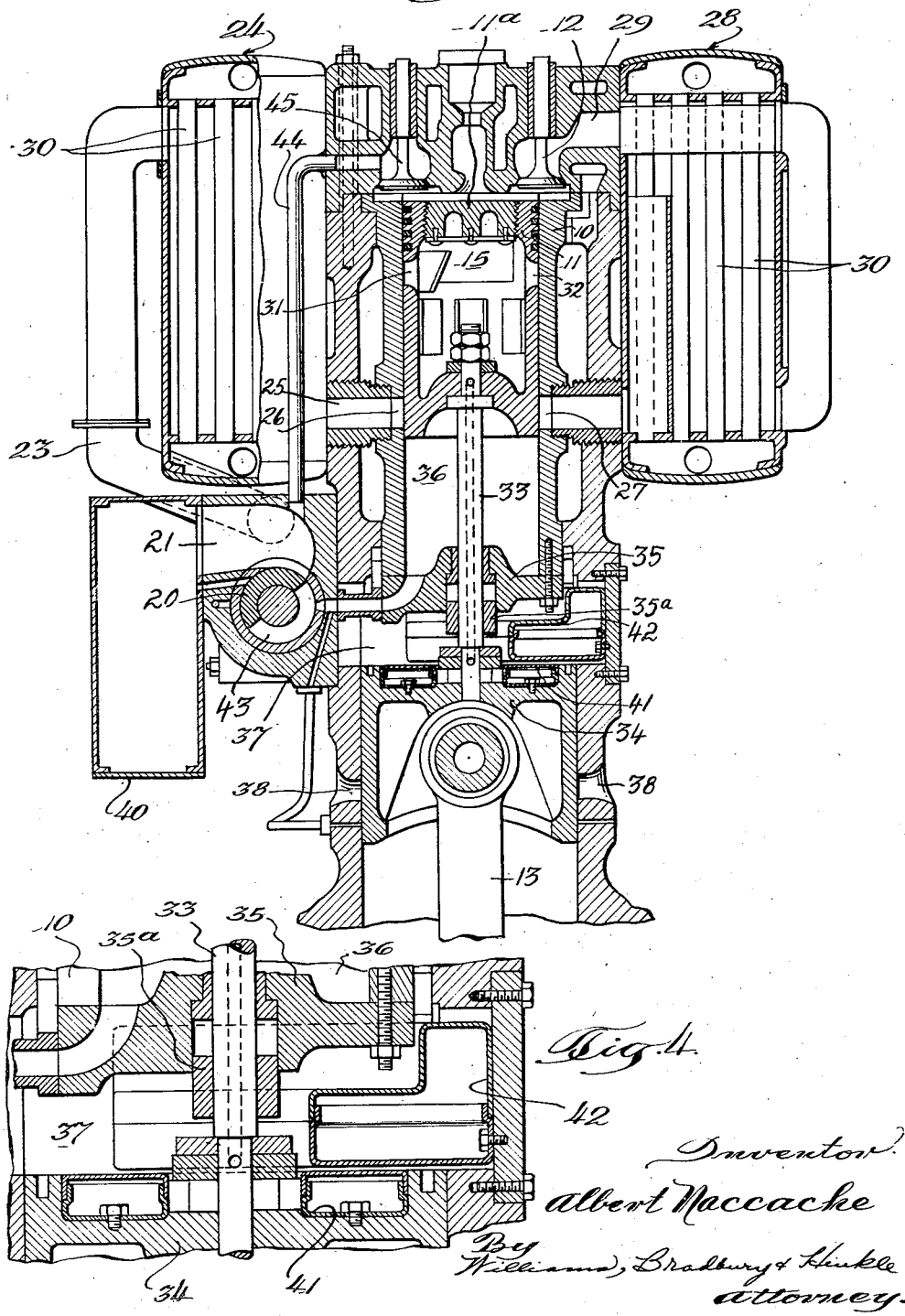

Patented May 14, 1946

2,400,432

UNITED STATES PATENT OFFICE 2,400,432

INTERNAL-COMBUSTION ENGINE

Albert Naccache, Beirut, Lebanon

Application December 18, 1941, Serial No. 423,531
In Lebanon August 27, 1940

5 Claims. (Cl. 123—69)

The present invention relates to internal combustion engines (this expression including both the engines in which the fuel is caused to explode by substantially instantaneous ignition and which will be hereinafter called "explosion" engines, and those in which the fuel is caused to burn gradually and which will be hereinafter called "combustion" engines) of the self compression type as described in my United States Patent No. 2,242,538, issued on May 20, 1941, and entitled Internal combustion engine.

The object of the present invention is to provide improvements in engines of this type.

Internal combustion engines of the usual or conventional type working on the four-stroke cycle are essentially characterized by the fact that the compressions and expansions that take place are all performed in the same space (to wit between the top of the piston and the cylinder head), which involves the following chief drawbacks:

a. The possibilities of the engine are badly utilized since the compression chamber, which is built for resisting the maximum pressures, is used, for most of the cycle, to perform a mere precompression and general expansion work. This precompression work might advantageously be performed in the lower part of the engine, which, in the conventional type of engines, is utilized merely for transforming a rectilinear reciprocating movement into a rotary movement;

b. As the compression and expansion after explosion or combustion take place in the same space, they occur under unfavorable circumstances both from the point of view of efficiency and from that of heat dispersion;

c. The rise of temperature resulting from the compression and expansion is particularly important on the piston as the latter cannot be cooled as easily as the cylinder;

d. The residual gases present in the explosion or combustion chamber are not expelled during the fourth stroke of the cycle. This reduces the volume of fresh gases admitted during the next stroke, produces a rise of temperature of the gases thus admitted, and increases the compression work and the risks of pre-ignition;

e. The final compression pressure cannot be raised beyond certain limits, as this would be desirable for improving the thermal efficiency, because of the risks of spontaneous ignition and of the necessity of increasing the weight of the fixed and movable parts subjected to this pressure.

As above stated, the invention relates to engines of a type in which the compression ratio can be increased owing, in particular, to an improvement of the piston cooling, to the provision of means for cooling the feed gases, highly pre-compressed before entering the cylinders, and to an integrally compound working.

This type of engine, described in my above mentioned patent and which includes the usual elements of reciprocating engines, is characterized, in particular, in that the upper portion of a piston (in the hypothesis of a vertical engine) works as in a conventional four-stroke engine, while the lower portion acts as a volumetric compressor of the two-stroke cycle type.

Furthermore, the gases to be fed to the engine are caused, before entering the working chamber of the cylinder, to flow on the one hand through the inside of the piston so as to cool it, and, on the other hand, through suitably cooled regulating reservoirs located on either side of the piston.

In other words, in such an engine, the gases to be fed to the engine are subjected to a high pre-compression in the lower part of the engine, and are then caused to flow, successively, through a cooled regulating reservoir, across the inside of the piston through a second cooled regulating reservoir, and finally to the top part of the engine cylinder, which thus receives a pre-compressed and cooled mixture and performs the final compression and the other parts of the cycle.

As above stated, the object of the present invention is to provide an improved engine of the type just above described.

For this purpose, according to a feature of the invention, the lower portion of the engine is adapted to constitute a supplementary volumetric compressor, in addition to the compressor above mentioned, this supplementary compressor serving, for instance, to drive out the residual gases from the explosion chamber at the end of the fourth stroke of the cycle.

Other features of the present invention will result from the following detailed description of some specific embodiments thereof.

Preferred embodiments of the present invention will be hereinafter described, with reference to the accompanying drawings, given merely by way of example, and in which:

Fig. 2 is a detailed sectional view taken substantially on the line 2—2 of Fig. 1;

Fig. 3 is a detailed sectional view taken substantially on the line 3—3 of Fig. 1;

Fig. 4 is a detailed view of the construction of the volume reducing means placed in the precompression chamber; and Fig. 5 is a sectional view similar to Fig. 1 showing the connections used in clearing the power cylinder of burned gases.

Figure 1:
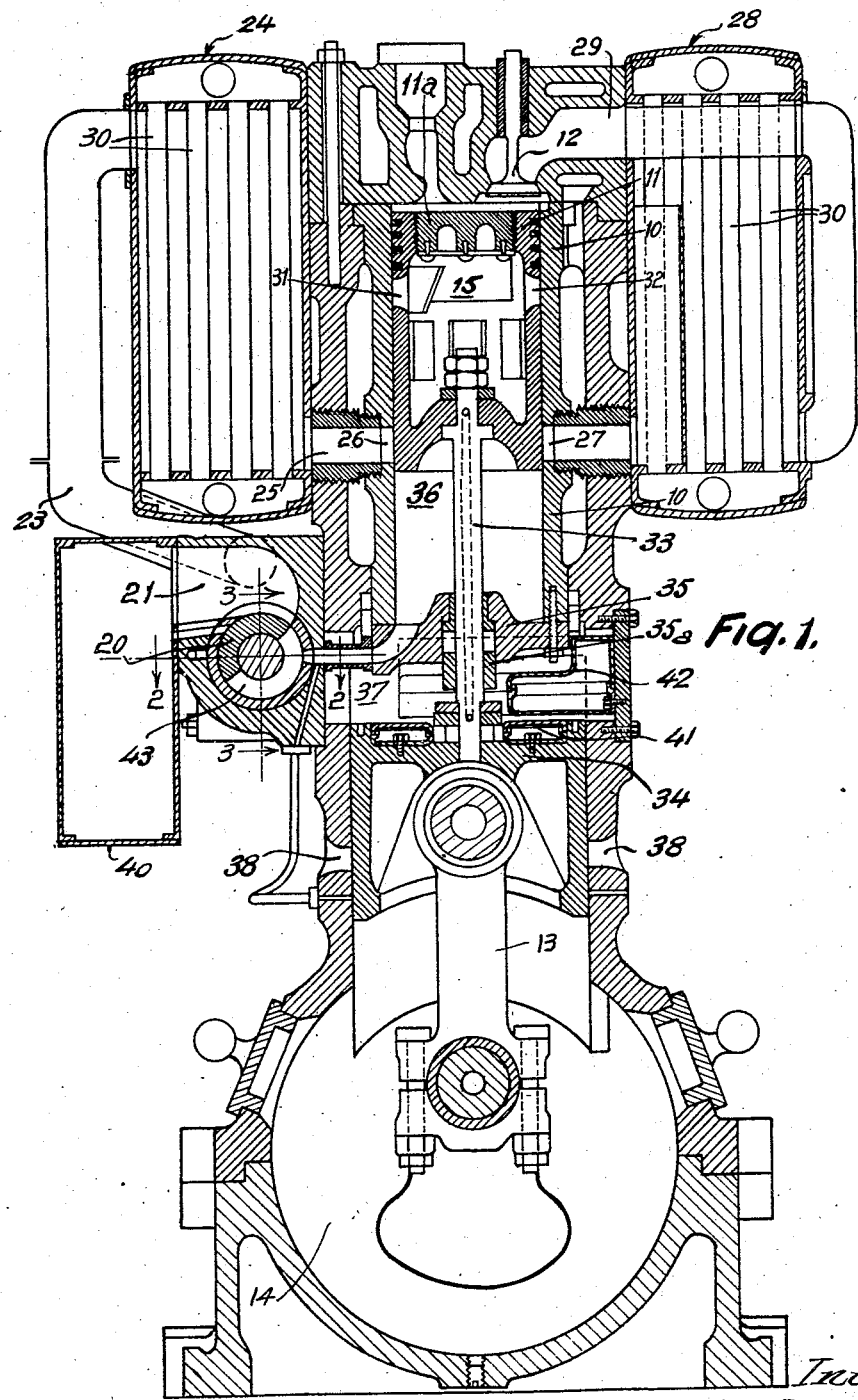
Fig. 1 is an axial sectional view of an engine made according to a preferred embodiment of the invention; this engine including a double compression chamber.

Reference character 10 designates the cylinder, 11 the piston with its end 11a fixed thereto, 12 the inlet valve, 13 the connecting rod and 14 the crankcase. In the piston, there is provided a chamber 15 through which pass the fresh gases to be fed to the explosion chamber of the cylinder, the chamber 15 serving to cool the piston through the inner surface thereof, as will hereinafter be explained.

The piston 11 is connected to a crosshead 34 by means of a rod 33, the crosshead being connected to the connecting rod 13. The cylinder 10 is closed in the lower part thereof by a partition 35 through which the rod 33 passes in a fluid-tight manner, owing to a stuffing box 35a. There is formed between the lower side of the piston 11 and the upper side of the partition 35 a compression chamber 36 which together with the piston 11 and partition 35 make up the parts for a compressor which is controlled by a valve 20.

Between the partition 35 and the crosshead 34 there is formed a supplementary compression chamber 37. The feed of this supplementary compression chamber 37 is insured by apertures 38 provided in the frame and the guides of the crosshead.

The discharge from the chamber 37 is controlled by a rotary distributing valve 37a commanding a passage 39 connecting the chamber 37 of the supplementary compressor with the inside of a special supplementary reservoir 40.

The valve 20 permits the fuel mixture to enter compressor chamber 36 from the reservoir 40 through the inlet 21. Another rotary valve 22a causes the mixture thus compressed to be discharged into a reservoir 24 through an orifice 22 and a passage 23a and conduit 23.

This reservoir communicates through an outlet channel 25 with an orifice 26 provided in the wall of cylinder 10. In the same wall, at the same height as orifice 26 and diametrally opposed with respect thereto, there is provided a second orifice 27 opening into a second regulating reservoir 28 the upper part of which communicates with the conduit 29 through which the inlet valve 12 of the engine is fed. The reservoirs 24 and 28 are preferably provided with a cooling device of any known type, shown at 30.

The chamber 15 of piston 11 is provided with two ports 31 and 32, diametrically opposed and located at the same level, which may, for a given position of the piston communicate simultaneously with the orifices 26 and 27 of the cylinder wall.

The structure of the upper portion of this improved engine is similar to that set out in my prior patent, No. 2,242,538, and operates in the manner set forth therein.

It will be possible to obtain the desired discharge of said supplementary compressor by levelling the upper surface of the cross-head and also by reducing the final clearance volume existing at the end of the rearward stroke between the top of the cross-head and the lower face of partition 35. For this purpose, I may fit suitable fluid-tight closed boxes 41 and 42 on certain organs of the engine. The structure of these boxes is clearly shown in Fig. 4.

When the chamber 37 is used for precompression the engine will operate in the following manner:

At the lower end of a down stroke (either a power stroke or a suction stroke in a four-cycle engine) the crosshead uncovers the apertures 38 to receive the gases to be precompressed. On the upstroke the gases are compressed and just prior to the termination of this stroke when the pressure has reached its desired maximum the valve 37a opens the passageway 39 between the chamber 37 and the supplementary reservoir 40 permitting the compressed gases to pass therethrough into the reservoir 40. On the next upstroke of the engine the gases flow through the passage 43 in the valve 20 into the chamber 36 where they will be further compressed. As the piston 11 drives downwardly the gases in the chamber 36 are put under additional pressure. Just before the end of this compression stroke the valve 22a opens the passage 22 to the conduit 23 and regulating reservoir 24. Each time the piston 11 is at the bottom of its strokes the ports 31 and 32 are located opposite the orifices 26 and 27 of the cylinder wall and afford the communication between reservoirs 24 and 28 across the chamber 15 of piston 11, thus cooling the piston from the inside thereof. The power portion of the cylinder 10 draws its gases from the reservoir 28 through the conduit 29 when the valve 12 is opened by action of the cam shaft.

The valves 20, 22a and 37a are on a common shaft and are so adjusted that they open and close their respective passageways in proper sequence and with proper timing so as to give the desired pressure in the chambers 37 and 36.

The compressed air fed by this supplementary compressor may be used for various purposes, for instance:

In the case of an "explosion" engine, this air is discharged from the supplementary reservoir 40 and through a conduit 44 and a special inlet valve 45 into the upper part of the engine working on the four-stroke cycle (see Fig. 5). This special inlet valve 45 is controlled from the cam shaft in such manner as to open a certain time before the end of the fourth stroke and to close quickly at the beginning of the first stroke.

The compressed air coming from the supplementary reservoir, drives out, in due time, the inert residual gases from the upper part of the engine. Pre-ignition of the compressed gaseous mixtures coming from the second regulating reservoir 28 becomes impossible.

As the gases which undergo the final compression, in the engine cylinder, do not contain inactive gases at high temperature (the compression of which absorbs an unproductive work) the general efficiency is improved.

The feed of active gaseous mixture takes place directly from the volumetric compressor 36 located immediately under the piston.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An engine of the type described which comprises, in combination, at least one cylinder, a partition in said cylinder, a hollow piston in said cylinder adapted to form the engine combustion chamber between one face of said piston and one end of said cylinder, and also to form a compressor chamber between its other face and one face of said partition, a cross-head slidable in said cylinder, means for mechanically connecting said cross-head with said piston, said cross-head being adapted to form a second compressor chamber between itself and the other face of said partition, at least one reservoir located on one side of said cylinder, means for cooling said reservoir, inlet means for connecting said reservoir with said combustion chamber, a second reservoir, means for discharging compressed fluid from said first mentioned compressor chamber to said first reservoir through the inside of said piston, and means for discharging compressed fluid from said second mentioned compressor chamber into said second mentioned reservoir.

2. An engine according to claim 1 in which the two last mentioned means include a common rotary distributing valve for controlling both of said compressor chambers.

3. An engine according to claim 1 including means for placing said second mentioned reservoir in communication with said first mentioned reservoir.

4. An explosion engine according to claim 1 in which said second mentioned reservoir is adapted to communicate with said combustion chamber before the end of the exhaust stroke.

5. An engine according to claim 1 further including means for cooling said second mentioned reservoir.

ALBERT NACCACHE.